(12) United States Patent
Kang et al.

(10) Patent No.: US 10,953,633 B2
(45) Date of Patent: Mar. 23, 2021

(54) STRENGTHENED THIN GLASS-POLYMER LAMINATES

(71) Applicant: Corning Incorporated, Corning, NY (US)

(72) Inventors: Kiat Chyai Kang, Painted Post, NY (US); Govindarajan Natarajan, Poughkeepsie, NY (US); Yu Xiao, Pittsford, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/423,956

(22) PCT Filed: Aug. 27, 2013

(86) PCT No.: PCT/US2013/056755
§ 371 (c)(1),
(2) Date: Feb. 25, 2015

(87) PCT Pub. No.: WO2014/035942
PCT Pub. Date: Mar. 6, 2014

(65) Prior Publication Data
US 2015/0258750 A1    Sep. 17, 2015

Related U.S. Application Data

(60) Provisional application No. 61/695,781, filed on Aug. 31, 2012.

(51) Int. Cl.
*B29C 65/02*    (2006.01)
*B32B 7/12*    (2006.01)
(Continued)

(52) U.S. Cl.
CPC ............ *B32B 17/064* (2013.01); *B29C 65/02* (2013.01); *B29C 65/54* (2013.01);
(Continued)

(58) Field of Classification Search
CPC ...... B29K 2105/0097; B29K 2105/253; B29K 2833/12; B29K 2909/08;
(Continued)

(56) References Cited

U.S. PATENT DOCUMENTS 2,366,514 A    1/1942    Gaylor
3,338,696 A    8/1967    Dockerty
(Continued)

FOREIGN PATENT DOCUMENTS

DE    2857054 A1    1/1981
EP    2062862 A1    9/2007
(Continued)

OTHER PUBLICATIONS

Certified English Translation of JP 2003-039597 (Sep. 2016).*
(Continued)

*Primary Examiner* — Alicia J Sawdon (57) ABSTRACT

A glass-polymer laminate structure includes a flexible glass substrate having a thickness of no more than about 0.3 mm. A polymer layer is laminated to a surface of the flexible glass substrate having a coefficient of thermal expansion (CTE) that is at least about 2 times a CTE of the flexible glass substrate. The polymer layer is laminated to the surface of the flexible glass substrate after thermally expanding the polymer layer to provide the flexible glass substrate with an in-plane compressive stress of at least about 30 MPa along a thickness of the flexible glass substrate.

19 Claims, 4 Drawing Sheets

(51) Int. Cl.
| | |
|---|---|
| *B32B 27/06* | (2006.01) |
| *B32B 17/06* | (2006.01) |
| *B32B 17/10* | (2006.01) |
| *B29C 65/54* | (2006.01) |
| *B29C 65/00* | (2006.01) |
| *B32B 27/30* | (2006.01) |
| *B29K 105/00* | (2006.01) |
| *B29L 9/00* | (2006.01) |
| *B29L 31/34* | (2006.01) |

(52) U.S. Cl.
CPC ............ *B29C 66/7465* (2013.01); *B32B 7/12* (2013.01); *B32B 17/101* (2013.01); *B32B 17/10018* (2013.01); *B32B 17/10036* (2013.01); *B32B 17/10743* (2013.01); *B32B 17/10752* (2013.01); *B32B 27/06* (2013.01); *B32B 27/308* (2013.01); *B29K 2105/0097* (2013.01); *B29K 2105/253* (2013.01); *B29K 2833/12* (2013.01); *B29K 2909/08* (2013.01); *B29K 2995/0026* (2013.01); *B29L 2009/00* (2013.01); *B29L 2031/3412* (2013.01); *B32B 2250/02* (2013.01); *B32B 2255/10* (2013.01); *B32B 2457/00* (2013.01); *Y10T 428/24628* (2015.01); *Y10T 428/266* (2015.01)

(58) Field of Classification Search
CPC ......... B29K 2995/0026; B29L 2009/00; B29L 2031/3412; B32B 17/064; B32B 17/10018; B32B 17/10036; B32B 17/101; B32B 17/10743; B32B 17/10752; B32B 2250/02; B32B 2255/10; B32B 2457/00; B32B 27/06; B32B 27/308; B32B 7/12; Y10T 428/24628; Y10T 428/266
See application file for complete search history.

(56) References Cited

U.S. PATENT DOCUMENTS

| | | | |
|---|---|---|---|
| 3,382,137 A | 5/1968 | Schreiber et al. | |
| 3,471,356 A | 10/1969 | Kolb et al. | |
| 3,682,609 A | 8/1972 | Dockerty | |
| 3,849,097 A | 11/1974 | Giffen et al. | |
| 4,596,622 A | 6/1986 | Heenan et al. | |
| 4,793,703 A * | 12/1988 | Fretz, Jr. | B32B 17/10018 351/159.62 |
| 4,842,664 A * | 6/1989 | Baudin | B29C 53/04 156/102 |
| 4,861,666 A * | 8/1989 | LeGrand | B32B 17/10 428/215 |
| 4,969,966 A | 11/1990 | Norman | |
| 5,139,857 A * | 8/1992 | Herndon | B32B 7/12 351/159.62 |
| 5,811,361 A | 9/1998 | Miwa | |
| 6,270,605 B1 | 8/2001 | Doerfler | |
| 6,660,387 B2 | 12/2003 | Oaku et al. | |
| 6,815,070 B1 * | 11/2004 | Burkle | B32B 3/04 427/165 |
| 7,201,965 B2 * | 4/2007 | Gulati | B32B 17/06 428/1.1 |
| 8,462,289 B2 | 6/2013 | Nishizawa et al. | |
| 2003/0077453 A1 * | 4/2003 | Oaku | B32B 17/10036 428/415 |
| 2006/0098153 A1 * | 5/2006 | Slikkerveer | G02F 1/133305 349/187 |
| 2006/0246231 A1 * | 11/2006 | Koishi | C09K 19/3852 428/1.3 |
| 2009/0226671 A1 | 9/2009 | Yanase et al. | |
| 2010/0090597 A1 * | 4/2010 | Werners | B32B 17/10036 313/512 |
| 2010/0192634 A1 * | 8/2010 | Higuchi | B29C 66/7465 65/60.1 |
| 2010/0202077 A1 * | 8/2010 | Kim | B29C 45/0001 359/894 |
| 2011/0154861 A1 | 6/2011 | Kishimoto et al. | |
| 2011/0200805 A1 | 8/2011 | Tomamoto et al. | |
| 2011/0244225 A1 | 10/2011 | Hattori et al. | |
| 2011/0281093 A1 | 11/2011 | Gulati et al. | |
| 2012/0040146 A1 | 2/2012 | Garner et al. | |
| 2012/0094100 A1 | 4/2012 | Takagi et al. | |
| 2012/0128952 A1 | 5/2012 | Miwa et al. | |
| 2012/0196103 A1 | 8/2012 | Murashige et al. | |
| 2013/0034685 A1 * | 2/2013 | An | H01L 51/524 428/121 |
| 2013/0196163 A1 | 8/2013 | Swanson | |
| 2014/0132132 A1 | 5/2014 | Chowdhury et al. | |

FOREIGN PATENT DOCUMENTS

| | | | |
|---|---|---|---|
| EP | 2204355 A1 | 10/2008 | |
| EP | 2236281 A1 | 1/2009 | |
| GB | 1184042 | 2/1967 | |
| GB | 2035899 A | 9/1978 | |
| JP | 05-43696 | 7/1993 | |
| JP | 07043696 | 2/1995 | |
| JP | 2001/113631 | 4/2001 | |
| JP | 2003/039597 | 2/2003 | |
| JP | 2003039597 A * | 2/2003 | |
| JP | 2009-141627 A | 6/2009 | |
| JP | 2009165279 A | 7/2009 | |
| JP | 2011/051278 A | 3/2011 | |
| JP | 2011-162412 A | 8/2011 | |
| WO | 79/00162 A1 | 5/1979 | |
| WO | WO-2009042877 A2 * | 4/2009 | ....... B32B 17/10045 |
| WO | 2010/023853 A2 | 4/2010 | |
| WO | 2011/152380 A1 | 8/2011 | |
| WO | 2011118692 A1 | 9/2011 | |
| WO | 02/14229 A1 | 2/2012 | |
| WO | 2012/051038 A1 | 4/2012 | |
| WO | 2012/166343 A2 | 12/2012 | |
| WO | 2016025188 A1 | 2/2016 | |

OTHER PUBLICATIONS https://www.dictionary.com/browse/flexible accessed Jan. 2, 2020.*
PCT/ISA/220 : International Search Report and written opinion of the international searching authority; dated Dec. 16, 2013.
Dinsmore & Shohl Search Results; Dated Sep. 24, 2012.
TW102131083 Search Report dated Mar. 19, 2017, Taiwan Patent Office.
English Translation of JP2015529918 Office Action dated Feb. 28, 2017, Japan Patent Office.

* cited by examiner

STRENGTHENED THIN GLASS-POLYMER LAMINATES

This application claims the benefit of priority under 35 U.S.C. § 371 of International Patent Application Serial No. PCT/US13/56755, filed on Aug. 27, 2013 designating the United States of America, which claims the benefit of priority under 35 U.S.C. § 119 of U.S. Provisional Application Ser. No. 61/695,781, filed on Aug. 31, 2012, the content of which is relied upon and incorporated herein by reference in its entirety.

FIELD

The present invention relates to glass-polymer laminate structures and, more particularly, to strengthened thin glass-polymer laminate structures.

BACKGROUND

Flexible polymer substrates are manufactured using a polymer base material laminated with one or more polymer films. These laminated substrate stacks are commonly used in flexible packaging associated with PV, OLED, LCDs and patterned Thin Film Transistor (TFT) electronics because of their low cost and demonstrated performance.

In order to promote flexible glass structures as an alternate technology selection, the real and perceived limitations of mechanical reliability performance associated with glass, a brittle material, must be overcome and demonstrated. Flexible glass substrates offer several technical advantages over flexible polymer technology. One technical advantage is the ability of the glass to serve as a moisture or gas barrier, a primary degradation mechanism in outdoor electronics. A second advantage is in its potential to reduce overall package size (thickness) and weight through the reduction or elimination of one or more package substrate layers. Another advantage is having excellent surface qualities associated with glass that can be cleaned easily. Thus, if the real and perceived limitations of mechanical reliability performance associated with glass can be overcome, the use of flexible glass structures can be advanced.

SUMMARY

One technique to improve the mechanical reliability of bare flexible glass is to laminate the flexible glass substrate with one or more thin film polymers. Depending on the mechanical strength requirements and the expected bending stresses and direction of the end application, according to the concepts disclosed herein, a flexible glass-polymer laminate substrate can be designed to meet mechanical requirements. When used properly, the laminated structure will offer improved mechanical reliability performance over a flexible un-laminated (bare glass) structure.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations. By way of non-limiting example the various features of the invention may be combined with one another according to the following aspects.

According to a first aspect, there is provided a glass-polymer laminate structure comprising:
a flexible glass substrate having a thickness of no more than about 0.3 mm; and
a polymer layer laminated to a surface of the flexible glass substrate having a coefficient of thermal expansion (CTE) that is at least about 2 times a CTE of the flexible glass substrate, the polymer layer laminated to the surface of the flexible glass substrate after thermally expanding the polymer layer to provide the flexible glass substrate with a compressive stress of at least about 30 MPa across a thickness of the flexible glass substrate.

According to a second aspect, a glass-polymer laminate structure comprising:
a flexible glass substrate having a thickness of no more than about 0.3 mm; and
a polymer layer laminated to a surface of the flexible glass substrate having a coefficient of thermal expansion (CTE) that is at least about 3 ppm/° C. greater than a CTE of the flexible glass substrate, the polymer layer laminated to the surface of the flexible glass substrate after thermally expanding the polymer layer to provide the flexible glass substrate with a compressive stress of at least about 30 MPa across a thickness of the flexible glass substrate.

According to a third aspect, there is provided the laminate structure of aspect 1 or aspect 2, wherein the flexible glass substrate has an in-plane compressive stress of at least about 80 MPa across the thickness of the flexible glass substrate.

According to a fourth aspect, there is provided the laminate of any one of aspects 1 to 3, wherein the polymer layer has a CTE that is at least about 10 times the CTE of the flexible glass substrate.

According to a fifth aspect, there is provided the laminate of any one of aspects 1 to 4, further comprising an adhesive layer that laminates the polymer layer to the flexible glass substrate.

According to a sixth aspect, there is provided the laminate of aspect 5, wherein the adhesive layer is heat activated, having an activation temperature of greater than about 50° C.

According to a seventh aspect, there is provided the laminate of aspect 5, wherein the adhesive layer is a pressure sensitive adhesive.

According to an eighth aspect, there is provided the laminate of aspect 5, wherein the adhesive layer is UV activated.

According to a ninth aspect, there is provided the laminate of aspect 1 to 8, wherein the flexible glass substrate is a first flexible glass substrate, the laminate structure further comprising a second flexible glass substrate laminated to the polymer layer, the polymer layer being between the first and second flexible glass substrates.

According to a tenth aspect, there is provided the laminate of aspect 9, wherein the polymer layer is formed of a liquid polymer.

According to an eleventh aspect, there is provided the laminate of aspect 10, wherein the polymer layer extends beyond an outer edge of at least one of the first and second flexible glass substrates.

According to a twelfth aspect, there is provided the laminate of aspect 1 to 11, wherein the polymer layer is a first polymer layer, the laminate structure further comprising a second polymer layer laminated to the flexible glass substrate, the flexible glass substrate being between the first and second polymer layers.

According to a thirteenth aspect, there is provided a method of forming a flexible glass-polymer laminate structure, the method comprising:

heating a polymer layer of the flexible glass-polymer laminate structure to an elevated temperature of greater than 20° C., the polymer layer having a coefficient of thermal expansion (CTE) that is at least 2 times a CTE of a flexible glass substrate of the flexible glass-polymer laminate structure;

laminating the polymer layer at the elevated temperature to the flexible glass substrate; and cooling the polymer layer below the elevated temperature to introduce a compressive stress of at least about 30 MPa across a thickness of the flexible glass substrate.

According to a fourteenth aspect, a method of forming a flexible glass-polymer laminate structure, comprising:

heating a polymer layer of the flexible glass-polymer laminate structure to an elevated temperature of greater than 20° C., the polymer layer having a coefficient of thermal expansion (CTE) that is at least about 3 ppm/° C. greater than a CTE of a flexible glass substrate of the flexible glass-polymer laminate structure;

laminating the polymer layer at the elevated temperature to the flexible glass substrate; and cooling the polymer layer below the elevated temperature to introduce a compressive stress of at least about 30 MPa across a thickness of the flexible glass substrate.

According to a fifteenth aspect, there is provided the method of aspect 12 or aspect 13, wherein the flexible glass substrate has an in-plane compressive stress of at least about 80 MPa across the thickness of the flexible glass substrate.

According to a sixteenth aspect, there is provided the method of aspect 13 to 15, wherein the polymer layer has a CTE that is at least about 10 times the CTE of the flexible glass substrate.

According to a seventeenth aspect, there is provided the method of aspect 11 to 13, comprising expanding the polymer layer relative to the flexible glass substrate as the polymer layer is heated to the elevated temperature.

According to an eighteenth aspect, there is provided the method of aspect 13 to 17, further comprising applying an adhesive layer between the flexible glass substrate and the polymer layer that laminates the polymer layer to the flexible glass substrate.

According to a nineteenth aspect, there is provided the method of aspect 18, comprising heat activating the adhesive layer after the polymer layer reaches the elevated temperature.

According to a twentieth aspect, there is provided the method of aspect 18, comprising pressure activating the adhesive layer after the polymer layer reaches the elevated temperature.

According to a twenty-first aspect, there is provided the method of aspect 18, comprising UV activating the adhesive layer after the polymer layer reaches the elevated temperature.

According to a twenty-second aspect, there is provided a method of forming a flexible glass-polymer laminate structure, the method comprising:

heating a polymer layer of the flexible glass-polymer laminate structure to an elevated temperature of greater than 20° C., the polymer layer having a coefficient of thermal expansion (CTE) that is at least about 3 ppm/° C. greater than a CTE of a flexible glass substrate of the flexible glass-polymer laminate structure;

laminating the polymer layer at the elevated temperature to the flexible glass substrate; and cooling the polymer layer below the elevated temperature to bend the flexible glass substrate while simultaneously providing a compressive stress across a thickness of the flexible glass substrate.

According to a twenty-third aspect, there is provided the method of aspect 22, wherein the step of heating the polymer layer comprises heating the polymer layer to a temperature of at least about 50° C. before laminating the polymer layer to the flexible glass substrate.

According to a twenty-fourth aspect, a flexible glass-polymer laminate structure, comprising:

a flexible glass substrate having a thickness of no more than about 0.3 mm; and a polymer layer laminated to a surface of the flexible glass substrate having a coefficient of thermal expansion (CTE) that is at least about 3 ppm/° C. greater than a CTE of the flexible glass substrate, the polymer layer laminated to the surface of the flexible glass substrate after thermally expanding the polymer layer providing the flexible glass substrate with a bent configuration while simultaneously providing a compressive stress along at least a portion of a thickness of the flexible glass.

DETAILED DESCRIPTION

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Although glass is an inherently strong material, its strength (reliability) is a function of its surface defect or flaw size density distribution and the cumulative exposure of stress to the material over time. During the entire product life cycle, a flexible glass-polymer laminate will be subjected to various kinds of static and dynamic mechanical stresses. Embodiments described herein generally relate to flexible glass substrates that are strengthened using a polymer layer. A relatively large coefficient of thermal expansion (CTE) mismatch between the polymer layer and the flexible glass substrate is utilized by laminating the polymer layer to the flexible glass substrate at an elevated temperature followed by a slow cooling. Such an elevated temperature lamination approach can create a uniformly distributed compressive residual stress across the thickness of the flexible glass substrate once the laminate structure is cooled.

Figure 1:
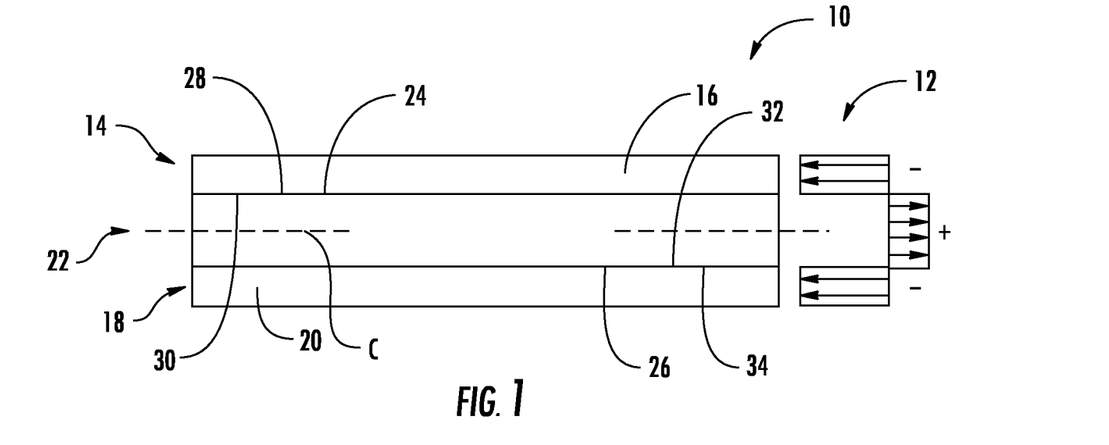
FIG. 1 is a schematic illustration of an embodiment of a symmetric flexible glass-polymer laminate structure.
Figure 2:
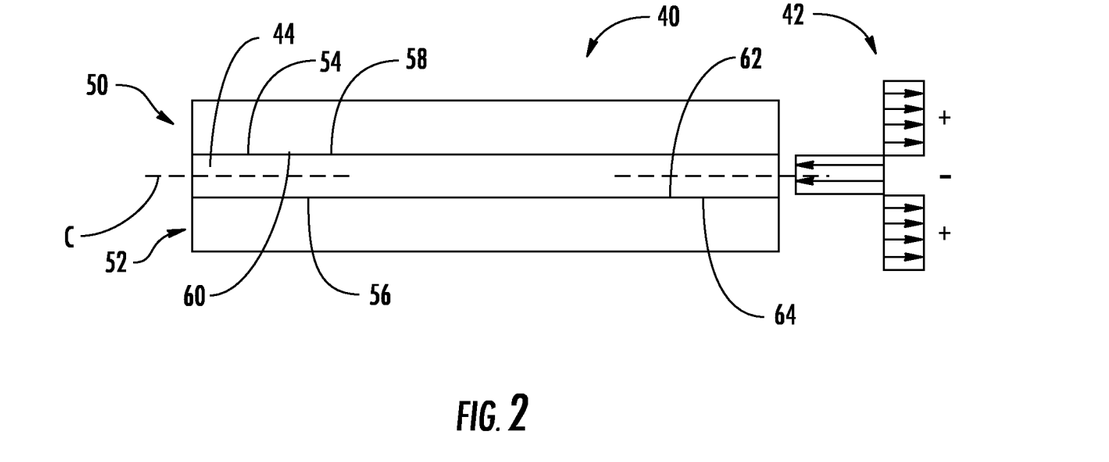
FIG. 2 is a schematic illustration of another embodiment of a symmetric flexible glass-polymer laminate structure.

Referring to FIGS. 1 and 2, two exemplary flexible glass-polymer laminate structures 10 and 40 are illustrated along with their corresponding stress diagrams 12 and 42. Referring first to FIG. 1, the flexible glass-polymer laminate structure 10 includes a first outermost glass layer 14 that is formed by a first flexible glass substrate 16 (having Eg, Vg, α, $t_g/2$), a second outermost glass layer 18 that is formed by a second flexible glass substrate 20 (having Eg, Vg, α, $t_g/2$) and a polymer layer 22 (having Ep, Vp, $α_p$, $t_p$) that is sandwiched between and laminated to the first and second flexible glass substrates 16 and 20. Adhesive layers 24 and 26 may be used to laminate the first and second flexible glass substrates 16 and 20 to the polymer layer 22 at the interfaces between their respective broad surfaces 28, 30 and 32, 34.

While FIG. 1 illustrates outermost glass layers 14 and 18, FIG. 2 illustrates an alternative embodiment with a flexible glass substrate 44 (having Eg, Vg, α, $t_g$) that is sandwiched between outermost polymer layers 50 and 52 (each having Ep, Vp, $α_p$, $t_p/2$). Again, adhesive layers 54 and 56 may be used to laminate the first and second polymer layers 50 and 52 to the flexible glass substrate 44 at the interfaces between their respective broad surfaces 58, 60 and 62, 64.

The stress diagrams 12 and 42 of FIGS. 1 and 2 illustrate that residual, in-plane compressive stresses are generated across the thicknesses of the flexible glass substrates 16 and 20 of the flexible glass-polymer laminate structure 10 and the flexible glass substrate 44 of flexible glass-polymer laminate structure 40, which are compensated by tensile stresses in the polymer layer 22 of the flexible glass-polymer laminate structure 10 and polymer layers 50 and 52 of the flexible glass-polymer laminate structure 40. Referring first to FIG. 1, the residual compressive stresses in the flexible glass substrates 16 and 20 of the flexible glass-polymer laminate structure 10 can be substantially uniformly distributed across the thicknesses of the flexible glass substrates 16 and 20 and generated by laminating the polymer layer 22 to the flexible glass substrates 16 and 20 at an elevated temperature and then cooling to room temperature. Similarly, referring to FIG. 2, the residual compressive stresses in the flexible glass substrate 44 of the flexible glass-polymer laminate structure 40 can be substantially uniformly distributed across the thickness of the flexible glass substrate 44 and generated by laminating the polymer layers 50 and 52 to the flexible glass substrate 44 at an elevated temperature and then cooling to room temperature, which will be described in greater detail below. Further, while tri-layer laminate structures are illustrated by FIGS. 1 and 2, the number of layers can be greater or less than three layers and selected depending on, for example, the end use and processing requirements. Various other layered laminate examples will be described herein.

The flexible glass substrates 16, 20 and 44 may be "ultra-thin" having a thickness $t_g$ of about 0.3 mm or less including but not limited to thicknesses of, for example, about 0.01-0.05 mm, about 0.05-0.1 mm, about 0.1-0.15 mm and about 0.15-0.3 mm. The flexible glass substrates 16, 20 and 44 may be formed of glass, a glass ceramic, a ceramic material or composites thereof. A fusion process (e.g., downdraw process) that forms high quality thin glass sheets can be used in a variety of devices such as flat panel displays. Glass sheets produced in a fusion process have surfaces with superior flatness and smoothness when compared to glass sheets produced by other methods. The fusion process is described in U.S. Pat. Nos. 3,338,696 and 3,682,609. Other suitable glass sheet forming methods include a float process, updraw and slot draw methods.

Strengthening Symmetric Flexible Glass-Polymer Laminates

A process is developed for strengthening flexible glass substrates that utilizes a large CTE mismatch (e.g., about 2 times or more, such as about 5 times or more, such as about 10 times or more) between the polymer layer and the flexible glass substrate by laminating the polymer layer and the flexible glass substrate (e.g., as shown in FIGS. 1 and 2) at an elevated temperature and then slowly cooling to create a residual compressive stress across the thickness of the flexible glass substrate. In some embodiments, the CTE mismatch may be at least about 3 ppm/° C. or more, such as about 6 ppm/° C. or more, such as about 9 ppm/° C. or more, such as about 12 ppm/° C. or more, such as about 15 ppm/° C. or more, such as about 20 ppm/° C. or more, such as about 27 ppm/° C. or more, such as about 50 ppm/° C. or more. The flexible glass-polymer laminates may be classified as symmetric and asymmetric. A symmetric laminate structure is constructed such that the layers below a central plane C (FIGS. 1 and 2) of the laminate structure form a mirror image of the layers above the central plane C and asymmetric laminates do not have such a mirror image about their central planes. For symmetric flexible glass-polymer laminates formed of two different materials and having three or more layers with different CTE laminated at an elevated temperature, the compressive stress across the thickness of the flexible glass substrate at room temperature (assuming bi-axial deformation) is given by:

$$\sigma_g = -\frac{E_g}{(1-v_g) + E_g t_g (1-v_p)/E_p t_p}(\alpha_p - \alpha_g)(T_{lamination} - T_{room})$$

wherein:

E is Young's modulus, α is linear thermal expansion coefficient, t is total thicknesses of one type of material, ν is Poisson's ratio, and the subscripts "g" and "p" refer to "glass" and "polymer", respectively. $T_{lamination}$ refers to the curing temperature of the adhesive used in the lamination process.

Thus, the compressive stress in the flexible glass substrate can be increased by one or more of 1. reducing the glass layer thickness;
2. increasing the Young's modulus of the flexible glass substrate;
3. increasing the Young's modulus of the polymer layer;
4. increasing the thickness polymer layer;
5. increasing the thermal expansion coefficient difference between the flexible glass substrate and the polymer layer; and
6. increasing the lamination temperature.

While larger compressive stresses (e.g., 30 MPa or more, such as 50 MPa or more, such as 60 MPA or more, such as about 70 MPa or more such as about 80 MPa or more, such as about 90 MPA or more, such as about 100 MPa or more, such as about 110 MPa or more) are desired across the thickness of the flexible glass substrates, there are limits on the amount of compressive stress that can be introduced. For example, to achieve large compressive stresses in the flexible glass substrate, one approach is to set the lamination temperature as high as possible. However, the upper end of this lamination temperature should not exceed limits set by specific properties of the flexible glass-polymer laminate materials, such as the working temperature limit of any adhesive used. Material and structural integrity should be considered in insuring product reliability. Thus, various limits may affect the amount of compressive stress that can be introduced to the flexible glass substrate.

Forming Strengthened Flexible Glass-Polymer Laminates

Any number of lamination processes may be used to achieve the desired high compressive stresses in the flexible glass substrates. Importantly, the polymer layer should be allowed to thermally expand, at least to some degree, relative to the flexible glass substrate due to the large CTE mismatch between the flexible glass substrate and the polymer layer before laminating the polymer layer to the flexible glass substrate. Once laminated, the flexible glass-polymer laminate structure may be allowed to controllably cool (e.g., about 1-2° C./min or less) back down to room temperature, which introduces the compressive stress into the flexible glass substrate.

Examples of laminating at an increased temperature for generating a compressive stress due to a large CTE mismatch between a polymer layer and a flexible glass substrate are described below. These examples are exemplary in nature and are not meant to be limiting. For example, while a polymer layer of polymethyl methacrylate (PMMA) may be used in many of the examples discussed below, a polymer layer of polycarbonate may be used, as well as a number of other polymer materials, which are discussed below, having a relatively large CTE mismatch with the flexible glass substrate. PMMA and polycarbonate polymer materials may be desirable where transparency in the end use of the flexible glass-polymer laminate is preferred.

Example 1

UV Sensitive Adhesive

A flexible glass-polymer laminate structure as shown in FIG. 1 was formed using two flexible glass substrates 0.1 mm in thickness and a polymer layer formed of polymethyl methacrylate (PMMA), a transparent thermoplastic, having a thickness of 1.3 mm. A UV sensitive adhesive (NOA 68 commercially available from Norland Products) was applied about 20 nm in thickness between the polymer layer and the flexible glass substrate layers. The flexible glass-polymer laminate structure was placed on a thermoelectric hotplate and heated from one side maintained at 80° C., which was below the UV sensitive adhesive's working limit of 90° C. The UV sensitive adhesive was then cured using UV light applied to the UV sensitive adhesive from a side of the flexible glass-polymer laminate structure opposite the thermoelectric hotplate to bond the polymer layer at an elevated temperature to the flexible glass substrate layers and allowed to cool at a rate of 3° C./min. About a 110 MPa compressive stress in the flexible glass substrate was confirmed using birefringence measurements (FSM). Table I below highlights material properties for this exemplary flexible glass-polymer laminate structure and Table II below illustrates stress estimates using the compressive stress formula set forth above.

TABLE I

Materials

| Material | Young's Modulus (GPa) | Poisson's Ratio | Coefficient of Thermal Expansion ($10^{-6}$/° C.) | Thickness (mm) | Lamination Temp/Room Temp (° C.) |
|---|---|---|---|---|---|
| PMMA | 2.5 | 0.37 | 90 | 1.3 | 80/20 |
| Glass Substrate | 73.6 | 0.23 | 3.17 | 0.1 (0.2 total) | |

TABLE II

Stress Estimates

| | Compressive Residual Stress in Glass Substrate (MPa) | Tensile Residual Stress in PMMA (MPa) |
|---|---|---|
| Estimate | 105.8 | 16.3 |

Example 2

Heat Sensitive Adhesive

A flexible glass-polymer laminate structure as shown in FIG. 1 was formed using two flexible glass substrates 0.1 mm in thickness and a polymer layer formed of PMMA having a thickness of 1.3 mm. A heat sensitive adhesive (NOA 68H commercially available from Norland Products) was applied about 20 nm in thickness between the polymer layer and the flexible glass substrate layers. The flexible glass-polymer laminate structure was heated in a convection oven to a lamination temperature (cure at 100° C. for 3 hours, 3° C./min ramp-up rate, 1° C./min cooling rate, aged at 50° C. for 12 hours before cooling down to room temperature), which was below the softening temperature of the PMMA (91° C. to 115° C.), allowing the polymer layer to expand as the lamination temperature was reached to bond the polymer layer at an elevated temperature to the flexible glass substrate layers.

Example 3

Pressure Sensitive Adhesive

A flexible glass-polymer laminate structure as shown in FIG. 1 was formed using two flexible glass substrates 0.1 mm in thickness and a polymer layer formed of PMMA having a thickness of 1.3 mm. A pressure sensitive adhesive (8211 OCA commercially available from 3M) was applied (about 50 μm thick) between the polymer layer and the flexible glass substrate layers. The flexible glass-polymer laminate structure was heated in an autoclave to a lamination temperature, which was below the softening temperature of the PMMA (91° C. to 115° C.), allowing the polymer layer to expand as the lamination temperature was reached to bond the polymer layer at an elevated temperature to the flexible glass substrate layers (cured at 90 psi and 85° C. for 1 hour, 3° F./min ramp up and cooling rate).

While the above examples utilize an intermediate adhesive layer to bond the polymer layer and flexible glass substrate, other embodiments may include the polymer layer bonded directly to the flexible glass substrate without any use of an intermediate adhesive layer. For example, a polymer layer may be heated to a temperature above the plastic softening temperature (glass transition temperature), but below the melting temperature for the polymer. For PMMA, for example, the softening temperature is 91° C. to 115° C. and the melting temperature is 160° C. A combination of heat and pressure may be utilized (e.g., using an autoclave) to heat the polymer layer to a temperature between the softening temperature and the melting temperature. In some instances, the heated temperature may be held for a preselected period of time and then the flexible glass-polymer laminate structure may be cooled at a predetermined rate (e.g., less than about 3° F./min).

Figure 3:
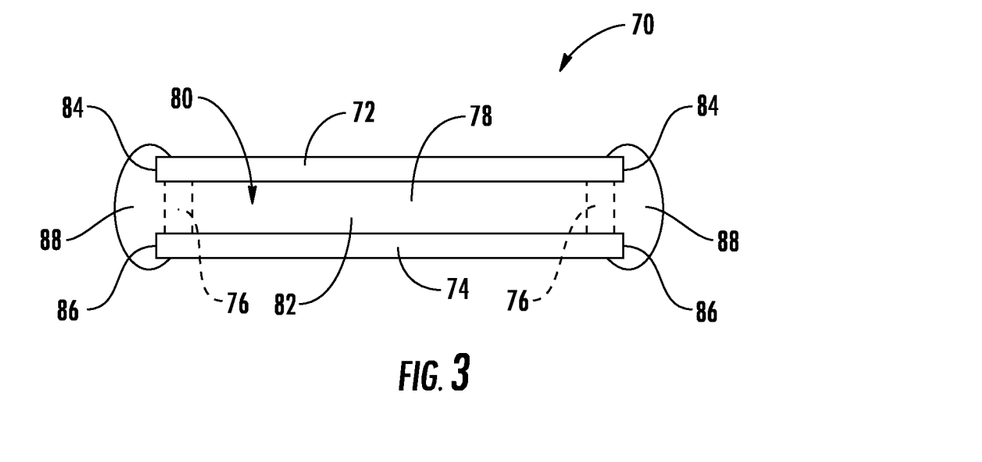
FIG. 3 is a schematic illustration of another embodiment of a flexible glass-polymer laminate structure having edge protection features.

As another example of a polymer layer, a liquid polymer solution may be injected into a space between flexible glass substrates. Referring briefly to FIG. 3, at an elevated temperature, a flexible glass-polymer laminate 70 may be formed by separating flexible glass substrates 72 and 74, for example, using spacers (represented by dotted lines 76). The liquid polymer solution 78 may be injected into a space 80 formed between the flexible glass substrates 72 and 74. Lamination of the polymer layer 82 to the flexible glass substrates 72 and 74 may be completed through polymer solidification (curing for example) and a controlled cooling step. Capillary forces, viscous flow and expansion of the liquid polymer solution 78 during heating may force the liquid polymer solution 78 beyond outer edges 84 and 86 of the flexible glass substrates 72 and 74, which can lead to encapsulating and covering the outer edges 84 and 86. This encapsulation of the outer edges 84 and 86 can provide an edge protection feature 88 for the flexible glass substrates 72 and 74 once the polymer layer 82 is formed. Such edge protection can be advantageous as the compressive stress at the edges of the flexible substrates 72 and 74 may be relatively low or even not present, even after formation of the polymer layer 82 and the edges may have a relatively low strength compared to the bulk glass. To facilitate bonding, adhesive promoters may be added to the polymer solution 78. Physical bonding, and in some instances chemical bonding, occurs between the polymer layer 82 and the flexible glass substrates 72 and 74.

In addition to the above-mentioned heaters and ovens, non-contact heaters, such as radiative heaters (and microwave heating) can be used to heat the polymer layers discussed herein. Radiative heaters emit infrared radiation, which can be absorbed by materials resulting in heat transfer to the heated body. Radiative heating can be efficient and rapid compared to convective or conductive heating, and does not require contact with the surface of the heated body. As one alternative to the heating of Example 1, the flexible glass-polymer laminate structure may be passed between a UV light source and a radiative heater, such that UV curing of the adhesive material is obtained at the desired temperature, which can be maintained by the radiative heating. Further, as a variation of Example 2, the convection oven may be replaced by two radiative heaters, one on either side of the flexible glass-polymer laminate structure. The process can be continuous by controlling the feed rate and power of the heaters to achieve heating, the lamination temperature and cooling. Multiple radiative heaters may be used to control heating, dwell and cooling rates.

Asymmetric Flexible Glass-Polymer Laminates

Lamination processes may also be used to manipulate or affect stress profiles in asymmetric flexible glass-polymer laminate structures. In these embodiments, the polymer layer is allowed to thermally expand relative to the flexible glass substrate due to the large CTE mismatch between the flexible glass substrate and the polymer layer before laminating the polymer layer to the flexible glass substrate. However, due to the asymmetric nature of the flexible glass-polymer laminate structures, bending, uniaxial or biaxial, may be introduced in the flexible glass substrate and the polymer layer.

Figure 4:
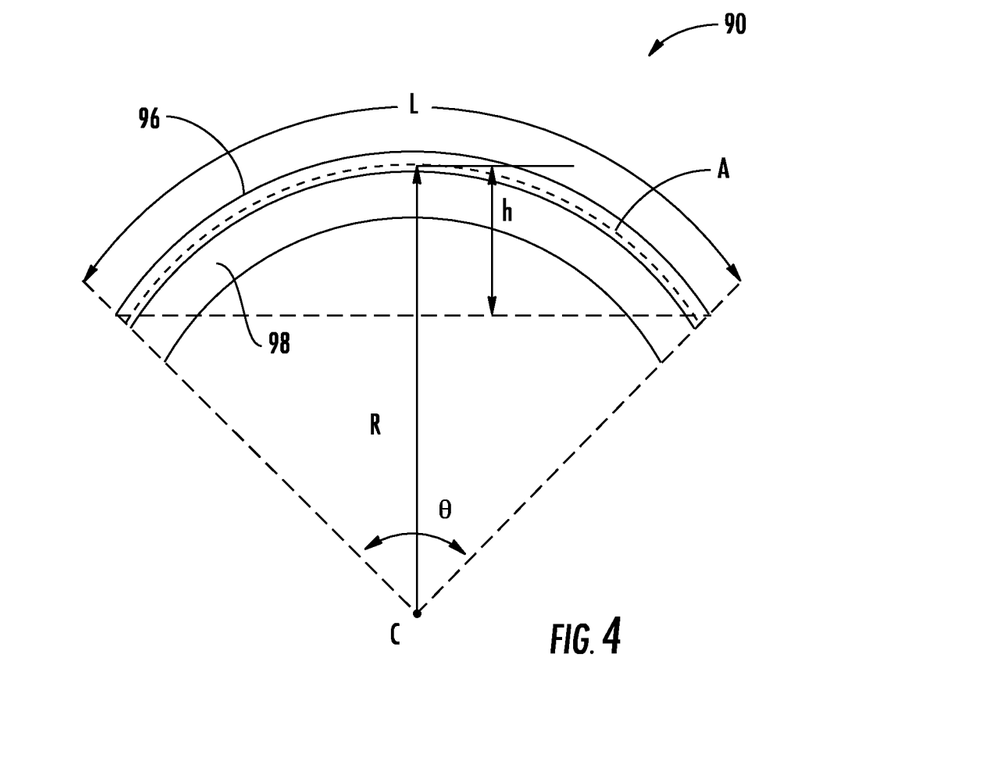
FIG. 4 illustrates schematically another embodiment of a flexible glass-polymer laminate structure having an asymmetric configuration.

Referring to FIG. 4, a uniaxial bending curvature induced by a CTE mismatch in an asymmetric flexible glass-polymer laminate structure 90 is given by (assuming plane stress and the flexible glass substrate 96 and polymer layer 98 have the same width and length dimensions):

$$\kappa = \frac{6(\alpha_p - \alpha_g)(T_{lamination} - T_{room})t_g t_p(t_g + t_p)}{E_g t_g^4 / E_p + 4 t_g^3 t_p + 6 t_g^2 t_p^2 + 4 t_g t_p^3 + E_p t_p^4 / E_g}$$

wherein:
κ is bending curvature, E is Young's modulus, α is linear thermal expansion coefficient, t is total thicknesses of one type of material, and the subscripts "g" and "p" refer to "glass" and "polymer", respectively. $T_{lamination}$ refers to the curing temperature of the adhesive used in the lamination process.

Bending curvature κ is related to the radius R measured from center C to the neutral axis A by:

$$R = \frac{1}{\kappa}$$

and is also related to an angle θ measured between ends 92 and 94 of the flexible glass-polymer laminate structure 90 by:

θ=L/R=θL.

Height h to the neutral axis can be determined by:

$$h = R\left(1 - \cos\left(\frac{\theta}{2}\right)\right) = \frac{1}{\kappa}\left(1 - \cos\left(\frac{\kappa L}{2}\right)\right).$$

Thus, bending characteristics of an asymmetric flexible glass-polymer laminate structure can be determined where the material properties and lamination temperatures are known. For example, for a 100 μm/500 μm/100 μm glass/polycarbonate/glass laminate, where polycarbonate has a Young's modulus E of 2.377 GPa, a CTE α of 67.5×10⁻⁶/° C. and a lamination temperature $T_{lamination}$ of 80° C., the height h, once cooled to room temperature, is about 11.3 mm.

Figure 5:
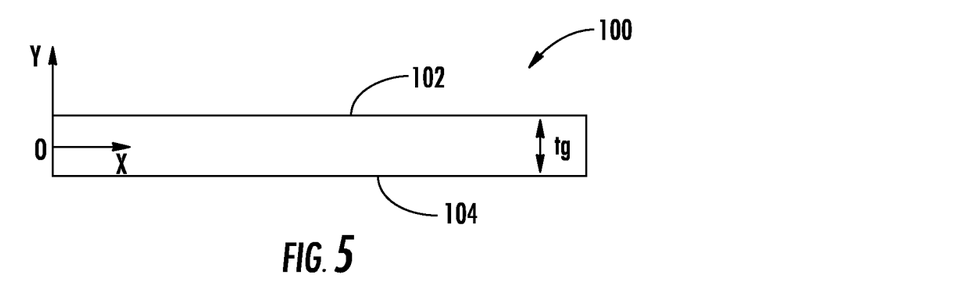
FIG. 5 is a schematic drawing of a piece of glass having a neutral bending axis.

Referring to FIG. 5, when an uncoated piece of glass 100 (either a sheet or ribbon of glass) is bent into a curve of radius R (such as when the glass is held in a device or bends around a roller during processing), there is created a stress in the glass. When the piece of glass 100 is subject to a bending moment, so that the glass achieves a bending radius R, the stress at a location (y) relative to the x-axis (neutral axis) can be calculated by:

$$\sigma = \frac{E_g y}{R(1-v_g^2)} \text{(plain strain)}$$

or $$\sigma = \frac{E_g y}{R} \text{(plain stress)}$$

wherein:
σ is the stress;
$E_g$ is the Young's modulus of the glass;
$v_g$ is the Poisson's ratio of the glass;
y is the position in the y-axis direction at which the stress σ is calculated;
R is the bending radius of the glass.

The maximum tensile stress occurs on either side of the glass 100, and will be either surface 102 or surface 104 depending on the bending direction. That is, if the glass 100 is bent so that surface 102 is convex, the maximum tensile stress will be on surface 102, whereas if the glass 100 is bent so that surface 104 is convex, the maximum tensile stress will be on surface 104. In either case, by substituting ½tg for y, the absolute value of the maximum stress $\sigma_{max}$ is defined by:

$$|\sigma_{max}| = \frac{E_g t_g}{2R(1-v_g^2)} \text{(plain strain)}$$

or $$|\sigma_{max}| = \frac{E_g t_g}{2R} \text{(plain stress)}$$

Laminating the polymer layer 98 at an elevated temperature to the flexible glass substrate 96 as shown in FIG. 4, for example, allows for manipulation of the stress profile, compared to the uncoated glass of FIG. 5. In particular, laminating the polymer layer 98 having the high CTE mismatch with the flexible glass substrate 96 to cause bending and introduce compressive stress in the flexible glass substrate can reduce or even eliminate the tensile stress that would be expected in a bent glass and can serve to strengthen the overall bent flexible glass laminate structure 90 (FIG. 4).

The following discussion illustrates the reduction in tensile stress in the flexible glass substrate in the flexible-glass polymer laminate. For an asymmetric flexible glass-polymer laminate formed of two different materials, the curvature induced by CTE mismatch (assuming uniaxial plane stress bending) is (as noted above):

$$\kappa_0 = \frac{6(\alpha_p - \alpha_g)(T_{lamination} - T_{room})t_g t_p (t_g + t_p)}{E_g t_g^4 / E_p + 4t_g^3 t_p + 6t_g^2 t_p^2 + 4t_g t_p^3 + E_p t_p^4 / E_g}$$

the neutral axis is given by:

$$y_0 = \frac{\alpha_p(E_p t_p^4 / E_g + 6t_p^3 t_g + 9t_p^2 t_g^2 + 4t_p t_g^3) + \alpha_g(E_g t_g^4 / E_p - 3t_g^2 t_p^2 - 2t_g t_p^3)}{6(\alpha_p - \alpha_g)t_g t_p (t_g + t_p)}$$

and the bending stress across the thickness of the flexible glass substrate at room temperature is given by:

$$\sigma = E_g(\kappa_0(y-y_0) + \alpha_g(T_{lamination} - T_{room}))$$

The bending stress at the top surface of the flexible glass substrate is given by:

$$\sigma_{glass\_top} = \frac{(\alpha_p - \alpha_g)(T_{lamination} - T_{room})t_p(2E_g t_g^3 + 3E_g t_g^2 t_p - R_p t_p^3)}{E_g t_g^4 / E_p + 4t_g^3 t_p + 6t_g^2 t_p^2 + 4t_g t_p^3 + E_p t_p^4 / E_g}$$

and the bending stress at the bottom surface (i.e., the interfacial surface with the polymer layer) is given by:

$$\sigma_{glass\_bottom} = \frac{(\alpha_p - \alpha_g)(T_{lamination} - T_{room})t_p(2E_g t_g^3 + 3E_g t_g^2 t_p + E_p t_p^3)}{E_g t_g^4 / E_p + 4t_g^3 t_p + 6t_g^2 t_p^2 + 4t_g t_p^3 + E_p t_p^4 / E_g}$$

wherein:
$E_g$, $v_g$ are the Young's modulus and Poisson's ratio of the flexible glass substrate;
$E_p$, $v_p$ are the Young's modulus and Poisson's ratio of the polymer layer;
$t_g$ is the thickness of the flexible glass substrate;
$t_p$ is the thickness of the plastic layer;
$\alpha_g$ is the coefficient of thermal expansion of the flexible glass substrate;
$\alpha_p$ is the coefficient of thermal expansion of the polymer layer;
$T_{lamination}$ is the lamination temperature;
$T_{room}$ is room temperature;
$\kappa_0$ is the bending curvature induced by the CTE mismatch;
σ is the bending stress; and
$y_0$ is the neutral axis of the bent laminates.

Figure 6:
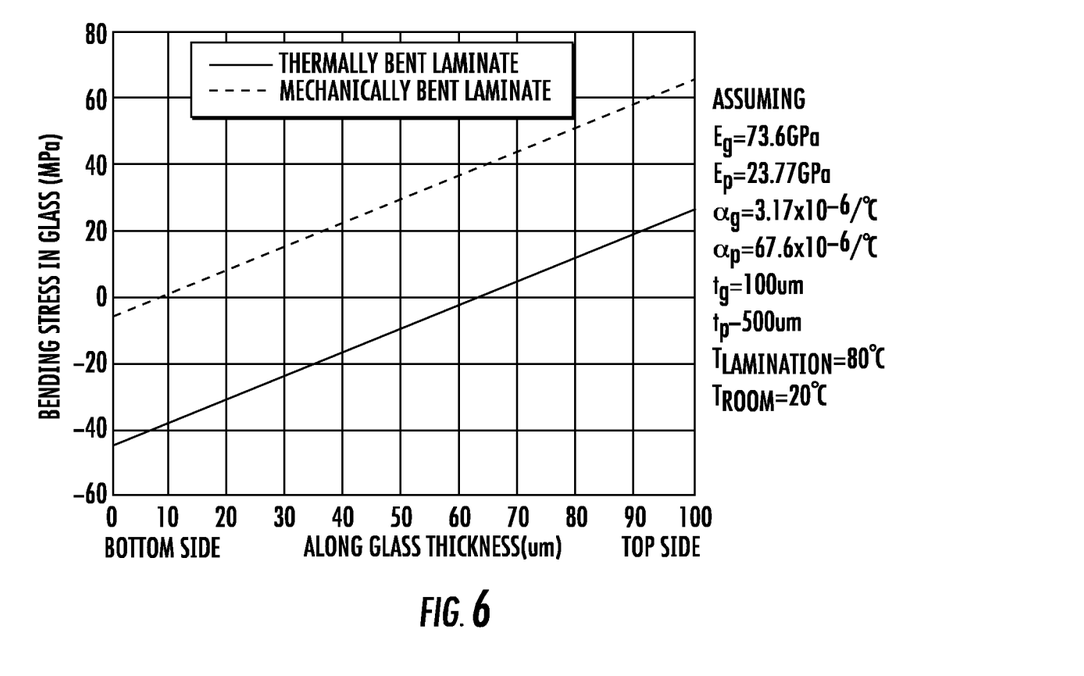
FIG. 6 illustrates a tensile stress reduction in an exemplary thermally bent laminate.

Referring to FIG. 6 and the above equations particularly for bending stress, it can be seen that tensile stress inside a thermally bent, flexible glass substrate is much less than a mechanically bent flexible glass substrate. This reduction in the tensile stress can be seen throughout the thickness of the flexible glass substrate from the bottom side to the top side. It should be noted, however, that the stress across the entire thickness of the flexible glass substrate is not uniform as depicted in FIGS. 1 and 2 due to the bending of the flexible glass substrate. In this embodiment, only a portion of the thickness of the flexible glass is at or above 30 MPa nearer the bottom side of the flexible glass substrate.

General Considerations

The polymer layers for use in the laminate structures described herein may include various polymers, for example, any one or more of polyethylene teraphthalate (PET), polyethylene Naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from BuPont. The polymer layers may be transparent for some applications, but need not be for other applications.

Non-limiting examples of adhesive materials for laminating the polymer layers to the flexible glass substrates at elevated temperatures include UV curable optical adhesives or optical cements such as those manufactured by Norland™ Optical Adhesives (NOA60, NOA61, NOA63, NOA65, NOA68, NOA68T, NOA71, NOA72, NOA73, NOA74, NOA75, NOA76, NOA78, NOA81, NOA84, NOA88, NOA89), Dow Corning™ (Sylgard 184 and other thermally curing silicones), Dymax™, and others. For heat-activated adhesive materials (e.g., NOA83H), adhesive materials with activation temperatures of greater than a preselected temperature (e.g., about 50° C. or more, such as about 70° C. or more, such as 80° C. or more, such as 100° C. or more) may be used to allow the polymer layer an opportunity to expand relative to the flexible glass substrate prior to its lamination thereto.

Additionally, each of the polymer layers may itself be a laminated or composite structure made of different types of polymer having different Young's moduli, different Poisson's Ratios, and/or layer thicknesses. In this case, one of skill in the art would be able to homogenize the compound layer to find effective values for the overall layer, including an effective thickness, an effective Young's modulus, and an effective Poisson's Ratio that may be used as described herein to beneficially configure a glass-polymer laminate. The composites, for example, may be formed of any combinations of the above materials and/or metals, such as stainless steel, nickel, copper, noble metals, metal oxides, etc.

The glass-polymer laminates described herein may be used as a substrate for mounting device-functional layers, or may be used as an encapsulant layer or barrier layer within the device. The device may be an electronic device, for example, a display screen (including a Liquid Crystal Display, a Plasma Display, an Organic Light Emitting Diode display, flat panel display, for example), a lighting-emitting device, or a solar cell module. The functional layers may include, for example, thin film transistors (TFTs), diodes, photodiodes, triodes, photovoltaic cells, photocouplers, transparent electrodes, color filter, or an electroconductive layer. The glass-polymer laminate may be used as a cover laminated onto the display screens. The glass-polymer laminate may be used as a substrate/encapsulant not only for OLEDs (small molecule fluorescence (SMF) and (LEP) light emitting polymers) but for other devices including an electrically active layer e.g. organic photo-detectors, organic solar-cells, thin-film-transistor (TFT) arrays and TFTs for OLEDs. Another use is for LEP products such as un-patterned backlights and other light sources or patterned devices such as signs, alpha-numeric displays or dot-matrix and other high-resolution displays.

The glass-polymer laminate may be a substantially transparent formable and/or flexible structure for use as a protective element in an electronic device, wherein the glass-polymer laminate is a composite structure comprising a layer of glass of a thickness from 5 to 300 microns, and a layer of polymer ranging in thickness from 50 microns to 1 cm or more. In this connection, the formability of the glass-polymer laminate allows it to deviate from full planarity by bending and/or twisting so it can adapt to the shape or form of some other object. Its flexibility allows it to be bent without detrimentally affecting its barrier properties.

The glass-polymer laminate can constitute a substrate for an electronic device and, as such, can be coated with a transparent electrode layer. The layer may be the anode and may be indium tin oxide or silver based conductors. As alternatives, the glass-polymer laminate may constitute an encapsulation film for light-emitting, or other electronic device.

The electronic device with the glass-polymer laminate can be manufactured in a sequence of integrated steps which include the construction of the glass-polymer laminate, deposition of the transparent electrode layer, deposition of the or each electrically active layer and deposition of the second electrode layer. A batch, semi-continuous or continuous process can be considered for the manufacture of the complete device. A further encapsulation layer on the second electrode layer can be provided. Various techniques for manufacturing the glass-polymer laminate are possible in accordance with different embodiments.

According to one embodiment, a polymer layer carrying a coating of a first transparent electrode (e.g. ITO) is provided. Then, at least one layer of an electrically active, e.g. electroluminescent, organic material is deposited followed by the second electrode layer. The complete structure is then laminated to the glass layer. According to another embodiment, the polymer and glass layers are exchanged in the preceding sequence. According to a further embodiment, the glass-polymer laminate is prefabricated and is then used as the basis for deposition of the first electrode layer, the at least one layer of an electrically active material and the second electrode layer.

The glass and polymer layers can be provided in sheet form according to a batch process. Alternatively, the glass layer can be provided in sheet form and the polymer layer from a continuous roll. As a further possibility, both glass and polymer layers are from continuous rolls. The composite structure can be formed by lamination of the glass and polymer layers, e.g. according to a batch process, a continuous roll-to-roll process or a semi-continuous process whereby the polymer layer is a continuous film and the glass layer is in sheet form.

For the polymer layer, it is possible to use polymers which can be deposited/coated as pre-polymers or pre-compounds and then converted, such as epoxy-resins, polyurethanes, phenol-formaldehyde resins, and melamine-formaldehyde resins. The lamination of the glass and polymer layers can be with glue/adhesive in between the layers. In that case, adhesive can be pre-coated onto one of the two or on both substrates; or supplied during the lamination process, at room or elevated temperature and with or without pressure. UV-cured glues are also suitable. The polymer layer can be in the form of polymer sheets which are pre-coated with a heat-seal glue. Lamination and/or deposition of the polymer layer onto the glass layer can be integrated in the fabrication process of the glass, i.e. glass comes off the fabrication line and is then (still hot or warm or cold) coated with the polymer.

As an alternative to formation by lamination, the polymer layer of the composite is coated onto the glass layer by a batch or continuous process. Coating of the polymer onto the glass can be by dip, spray, solution-spin, solution-blade, meniscus coating, or by coating of a molten polymer onto the glass layer. That is, it is possible to consider the different situations (i) where polymer exists already as film and is laminated to the glass and (ii) where polymer is not in film form but is coated onto the glass by dip, spray, etc. etc. The pre-polymers mentioned above, for example, are amenable to case (ii). However, also several of the other polymers mentioned above can be coated for case (ii). In this instance the polymers can be coated onto the glass principally by: coating from solution, from a melt or as pre-polymer.

In manufacture of an electronic device, it is usually necessary to subject some or all of the layers to processing steps. For example, if there is present an electroluminescent organic material that is a semiconductive conjugated polymer such as poly(phenylene vinylene) (PPV) then the deposition of that layer would normally take place by depositing a precursor to the polymer in a solvent, for example by spin-coating, and then subjecting that layer to a subsequent processing step to convert the precursor to the final polymer. Thus, the underlying glass-polymer laminate, if present during these processing steps, must be able to withstand the solvents used for spin-coating the precursor layer and the subsequent temperatures used for driving off the solvent and converting the precursor to the polymer. Thus, the polymer layer of the glass-polymer laminate needs to be of appropriate qualities. For example, if the glass-polymer laminate is to be subjected to high temperatures, then the glass-transition temperature of the polymer layer (and the working temperature of any adhesive used) should be above those temperatures. For example, a temperature of in excess of 150° C. is possible. Moreover, in certain situations, the polymer layer should be resistant to the solvent layers used for the polymers, such as mixed xylene, THF, used for soluble conjugated polymers such as MEH PPV.

Figure 7:
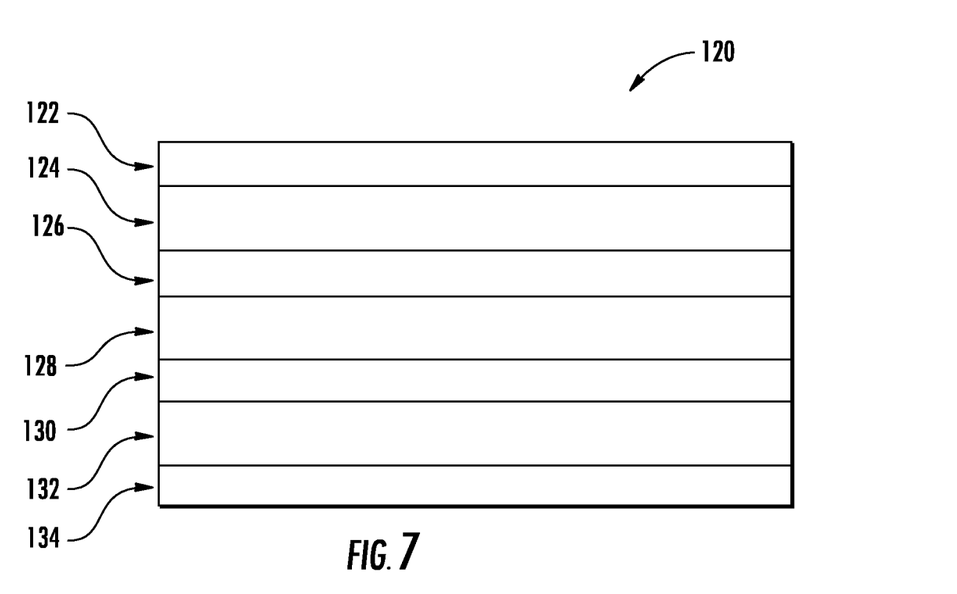
FIG. 7 is a schematic illustration of another embodiment of a flexible glass-polymer laminate structure.

The glass-polymer laminate can comprise more than two or three layers. Referring to FIG. 7, a flexible glass-polymer laminate structure 120 includes more than three layers, in this case, seven layers 122, 124, 126, 128, 130, 132 and 134 with layers 122 and 134 labeled Glass 1, layers 126 and 130 labeled Glass 2, layers 124 and 132 labeled Polymer 2 and layer 128 labeled Polymer 1. Here, the glass layers 122 and 134 form the outermost layers. Glass 1 and Glass 2 may have the same or different glass compositions (including Eg, Vg, $\alpha$, $t_g$) and may each be a single homogeneous sheet, or be glass laminates. Polymer 1 and Polymer 2 may be the same or of different materials (including Ep, Vp, $\alpha_p$, $t_p$) and can be either a single homogeneous polymer sheet or be laminates of different polymers.

Figure 8:
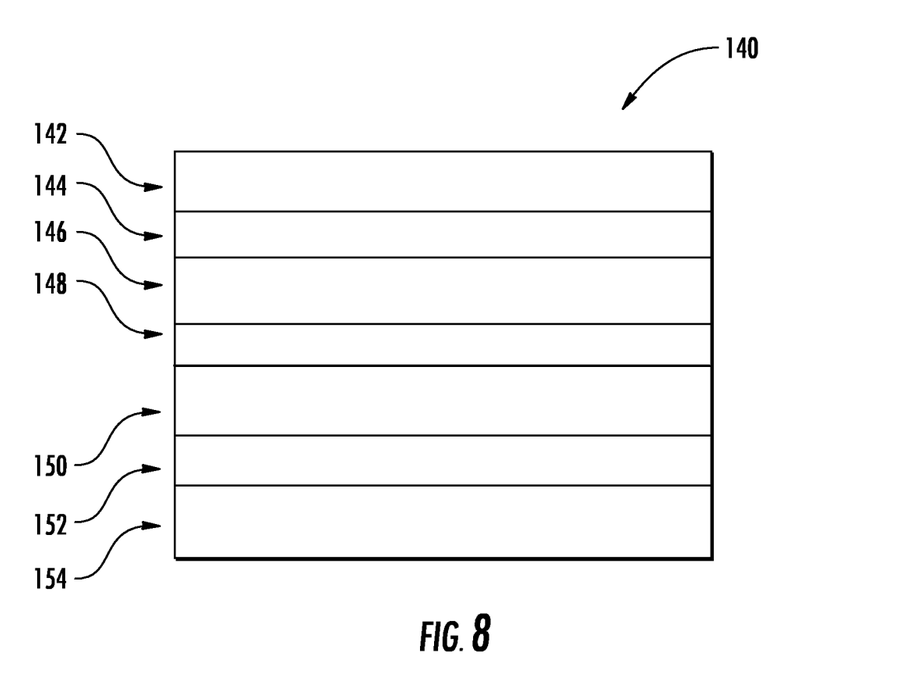
FIG. 8 is a schematic illustration of another embodiment of a flexible glass-polymer laminate structure.

Referring to FIG. 8, another flexible glass-polymer laminate structure 140 includes seven layers 142, 144, 146, 148, 150, 152 and 154 with layers 142 and 154 labeled Polymer 2, layers 146 and 150 labeled Polymer 1, layers 144 and 152 labeled Glass 2 and layer 148 labeled Glass 1. Here, the polymer layers 142 and 154 form the outermost layers (having Ep2, Vp2, $\alpha_{p2}$, $t_{p2}/2$). Glass 1 and Glass 2 (including: Eg1, Vg1, $\alpha_{g1}$, $t_{g1}$; and Eg2, Vg2, $\alpha_{g2}$, $t_{g2}/2$, respectively) may have the same or different glass compositions and may each be a single homogeneous sheet, or be glass laminates. Polymer 1 and Polymer 2 (including: Ep1, Vp1, $\alpha_{p1}$, $t_{p1}/2$; and Ep2, Vp2, $\alpha_{p2}$, $t_{p2}/2$, respectively) may be the same or of different materials and can be either a single homogeneous polymer sheet or be laminates of different polymers.

The above-described flexible glass-polymer laminate structures provide increased strength to ultra-thin flexible glass substrates. Nearly constant uniform compressive stress can be provided through the glass thickness for symmetric laminate structures. The polymer layers can provide breakage protection and hold the flexible glass substrates together in the event of any breakage. The flexible glass-polymer laminate structures can provide touch and cover glass, which could be used to replace chemically strengthened glass. Curved display glass, such as that discussed above in connection with asymmetric flexible glass-polymer laminate structures can be provided. The flexible glass-polymer laminate structures can provide a barrier layer for thin film PV, such as BIPV applications and provide improved impact protection for PV modules. The flexible glass substrates can also act as a moisture barrier and block undesired UV light. A potential application is as an encapsulant for OLEDs.

Additional functionality can be incorporated into polymer layers. For example, the polymer layer can comprise a polymer polarizer sheet, a contrast-enhancing filter-laminate, have anti-reflective properties, color filter properties or color conversion properties. For example, it would be possible to have a device in which the light emitting layer emits blue light and in which the laminate contains, for example, red or green fluorescent molecules which absorb the blue and re-emit in the red or green. Alternatively or additionally, the polymer layer can be designed to block undesired ambient light and/or have scattering particles so that wave guiding is reduced and the brightness of the device is increased. Such additional functionalities could be incorporated in the glass layer. Where a third polymer layer is provided in the composite structure, this allows the possibility of two different types of polymer layers, providing the possibility for incorporating different additional functionalities into the different layers.

In addition to electronic devices, the above-described flexible glass-polymer laminate structures may be used in other areas, such as architectural surface decoration, protective coatings, electrochromatic windows, fire resistant surfaces and in various configurations of multi-stack structures required to meet ballistic glazing requirements. Similarly, the flexible glass-polymer laminate structures could act as a barrier material to protect films, structures and/or devices from oxygen and moisture ingress/permeation for applications such as organic/thin film, PV, OLED display and lighting.

The flexible glass-polymer laminate structures can take advantage of attributes from two classes of material (organic and inorganic). Polymer materials are easily scratched, degrade from environmental elements including sunlight exposure and provide poor moisture/oxygen barrier properties. Glass, on the other hand, is scratch resistant, durable and is known for excellent moisture/oxygen barrier properties. However, glass has higher density compared to polymer and is a brittle material where strength of glass is dictated by defects and flaws. The above described flexible glass-polymer laminate structures and methods of making them take advantage of these two classes of materials and combining into one laminate structure having improved barrier properties, lightweight and higher mechanical reliability compared to a bare thin glass stack.

CONCLUSION

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

What is claimed is:

1. A thermally bent, asymmetric glass-polymer laminate structure comprising:
   a flexible glass substrate having a thickness of no more than about 0.3 mm;
   a polymer layer laminated to a first surface of the flexible glass substrate, and
   an adhesive layer that laminates the polymer layer to the flexible glass substrate wherein the polymer layer has a coefficient of thermal expansion (CTE) that is at least 2 times a CTE of the flexible glass substrate, or has a CTE that is at least 3 ppm/° C. greater than a CTE of the flexible glass substrate,
   and wherein the polymer layer is laminated to the first surface of the flexible glass substrate using the adhesive that sets only after thermally expanding the polymer layer at an elevated temperature of greater than 20° C. and less than the softening temperature of the polymer to bond the polymer layer to the flexible glass substrate while thermally expanded to provide the flexible glass substrate with a thermally bent configuration that is bent toward the polymer layer when the polymer layer is controllably cooled at a rate of less than or equal to 1-2° C./minute thereby reducing a tensile stress in the flexible glass substrate due to the bent configuration;
   wherein the flexible glass substrate has a compressive stress of greater than about 30 MPa at the first surface and a tensile stress of less than about 40 MPa at a second surface that is opposite the first surface.

2. The laminate structure of claim 1, wherein the flexible glass substrate has a compressive stress of at least about 80 MPa across the thickness of the flexible glass substrate.

3. The laminate structure of claim 1, wherein the polymer layer has a CTE that is at least about 10 times the CTE of the flexible glass substrate.

4. The glass-polymer laminate structure of claim 1, further comprising a first polymer layer and a second polymer layer wherein the flexible glass substrate layer is placed between the first polymer layer and the second polymer layer.

5. The glass-polymer laminate structure of claim 4, wherein in-plane compressive stresses generated across a thickness of the flexible glass substrate layer are compensated by tensile stresses in the first polymer layer and the second polymer layer.

6. The glass-polymer laminate structure of claim 1, further comprising a first flexible glass substrate layer and a second flexible glass substrate layer, wherein the polymer layer is placed between the first flexible glass substrate layer and the second flexible glass substrate layer.

7. The glass-polymer laminate structure of claim 6, wherein in-plane compressive stresses generated across a thickness of the first flexible glass substrate layer and a thickness of the second flexible glass substrate layer are compensated by tensile stresses in the polymer layer.

8. The glass-polymer laminate structure of claim 6, wherein the polymer layer extends beyond an outer edge of at least one of the first and the second flexible glass substrates to form an edge protection feature.

9. The glass-polymer laminate structure of claim 1, wherein the flexible glass substrate and the laminate layer are heated to a lamination temperature.

10. The glass-polymer laminate structure of claim 9, wherein the lamination temperature is from about 80° C. to about 160° C.

11. The glass-polymer laminate structure of claim 1, wherein the glass substrate is formed by a fusion process.

12. The glass-polymer laminate structure of claim 1, wherein the polymer layer comprises at least one polymer selected from the group of polyethylene teraphthalate (PET), polyethylene naphthalate (PEN), ethylene tetrafluoroethylene (ETFE), thermopolymer polyolefin, polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate, polysiloxanes and combinations thereof.

13. The glass-polymer laminate structure of claim 12, wherein the polymer layer comprises polymethyl methacrylate.

14. The glass-polymer laminate structure of claim 1, wherein the polymer layer is a laminated or composite structure.

15. The glass-polymer laminate structure of claim 1, wherein the glass-polymer laminate is transparent.

16. The glass-polymer laminate structure of claim 1, wherein the glass polymer laminate is flexible.

17. The glass-polymer laminate structure of claim 1, further comprising more than 3 glass or polymer layers.

18. The glass-polymer laminate structure of claim 1, further comprising functional layers.

19. The glass-polymer laminate structure of claim 18 wherein said functional layer is selected from the group of thin film transistors (TFTs), diodes, photodiodes, triodes, photovoltaic cells, photocouplers, transparent electrodes, color filters and electroconductive layers.

* * * * *

UNITED STATES PATENT AND TRADEMARK OFFICE
CERTIFICATE OF CORRECTION

PATENT NO. : 10,953,633 B2
APPLICATION NO. : 14/423956
DATED : March 23, 2021
INVENTOR(S) : Kiat Chyai Kang et al.

Page 1 of 1

It is certified that error appears in the above-identified patent and that said Letters Patent is hereby corrected as shown below:

In the Claims

In Column 17, Line 36, Claim 2, after "The" insert -- glass-polymer --.

In Column 17, Line 39, Claim 3, after "The" insert -- glass-polymer --.

In Column 18, Line 23, Claim 12, delete "teraphthalate" and insert -- terephthalate --, therefor.

In Column 18, Line 26, Claim 12, delete "polyvinylbuterate," and insert -- polyvinylbutyrate, --, therefor.

In Column 18, Lines 28-29, Claim 12, delete "polyethylenenaphalate," and insert -- polyethylenenaphthalate, --, therefor.

In Column 18, Line 44, Claim 16, delete "glass polymer" and insert -- glass-polymer --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*